United States Patent
Umetani

(10) Patent No.: US 7,184,494 B2
(45) Date of Patent: Feb. 27, 2007

(54) REGENERATED DATA SIGNAL GENERATION APPARATUS

(75) Inventor: Masato Umetani, Tokyo (JP)

(73) Assignee: Oki Electric Industry, Co., Ltd., Tokyo (JP)

( * ) Notice: Subject to any disclaimer, the term of this patent is extended or adjusted under 35 U.S.C. 154(b) by 707 days.

(21) Appl. No.: 10/354,124

(22) Filed: Jan. 30, 2003

(65) Prior Publication Data
US 2003/0231717 A1    Dec. 18, 2003

(30) Foreign Application Priority Data
Jun. 13, 2002   (JP)   ............... 2002-172741

(51) Int. Cl.
*H04L 27/14*   (2006.01)
*H04L 27/16*   (2006.01)
*H04L 27/22*   (2006.01)

(52) U.S. Cl. .............. 375/324; 375/322; 370/204

(58) Field of Classification Search ........... 375/324, 375/322; 370/204
See application file for complete search history.

(56) References Cited

U.S. PATENT DOCUMENTS

| | | | | |
|---|---|---|---|---|
| 5,289,293 A * | 2/1994 | Kato et al. | ............ | 358/3.07 |
| 5,412,692 A | 5/1995 | Uchida | | |
| 5,781,463 A * | 7/1998 | Ogawa et al. | ............ | 708/322 |
| 5,854,748 A * | 12/1998 | Snead et al. | ............ | 700/119 |
| 6,104,238 A | 8/2000 | Mattisson et al. | | |
| 6,188,346 B1 * | 2/2001 | Waho et al. | ............ | 341/156 |
| 6,320,830 B1 * | 11/2001 | Tsukamoto et al. | ...... | 369/47.19 |
| 6,333,741 B1 * | 12/2001 | Snead et al. | ............ | 345/423 |
| 6,504,498 B1 * | 1/2003 | O'Brien | ............ | 341/143 |
| 6,868,053 B2 * | 3/2005 | Gushima et al. | ......... | 369/59.11 |
| 2002/0126222 A1 * | 9/2002 | Choi et al. | ............ | 348/614 |
| 2003/0030857 A1 * | 2/2003 | Ito | ............ | 358/521 |
| 2003/0091124 A1 * | 5/2003 | Gupta et al. | ............ | 375/316 |

FOREIGN PATENT DOCUMENTS

| | | |
|---|---|---|
| JP | 04-207642 | 7/1992 |
| JP | 2003-198643 | 7/2003 |

OTHER PUBLICATIONS

Comparisons and improvements of designs of data slicers and clock synchronization circuits for broadcast teletext decoders operating in a multipath environment, Sablatash, M.; Moreland, K.W.; Moher, M.; Armstrong, R.M.; Broadcasting, IEEE Transactions on, vol. 34, Issue 3, Sep. 1988, pp. 381-397.*

* cited by examiner

*Primary Examiner*—Mohammed Ghayour
*Assistant Examiner*—Erin M. File
(74) *Attorney, Agent, or Firm*—Rabin & Berdo, P.C.

(57) ABSTRACT

A regenerated data signal generation circuit includes a receiving circuit, first and second binarization circuits and a signal preparation circuit. The receiving circuit receives a modulated signal and demodulates the modulated signal. The first binarization circuit receives the demodulated signal and binarizes the demodulated signal while compensates for offset deviation of the demodulated signal by a first method as to output a first binarization signal. The second binarization circuit receives the demodulated signal and binarizes the demodulated signal while compensates for offset deviation of the demodulated signal by a second method that is different from the first method so as to output a second binarization signal. The signal preparation receives the first and second binaraization signals and selectively outputs a regenerated data signal prepared from one of the binarization signals.

18 Claims, 8 Drawing Sheets

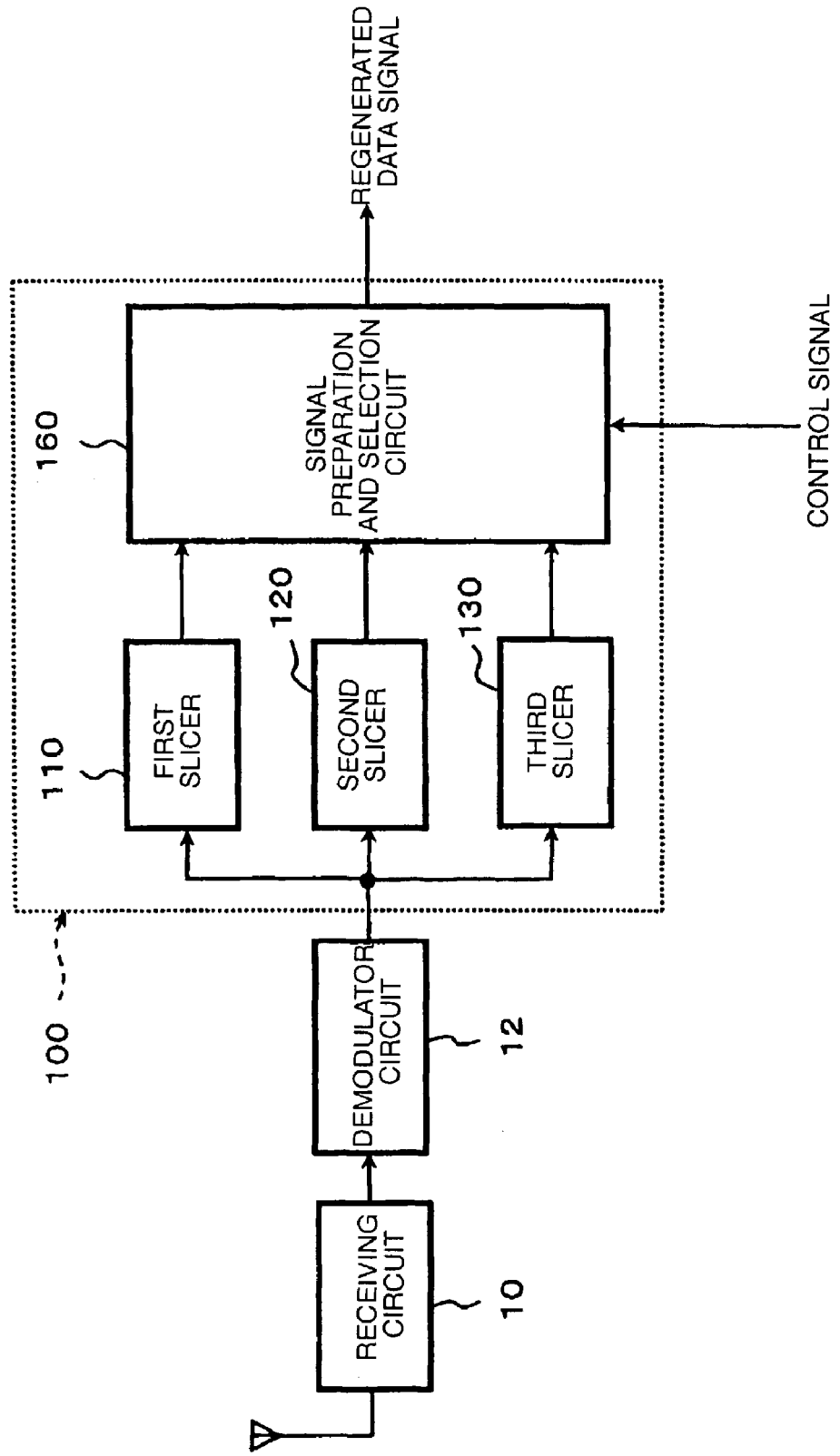

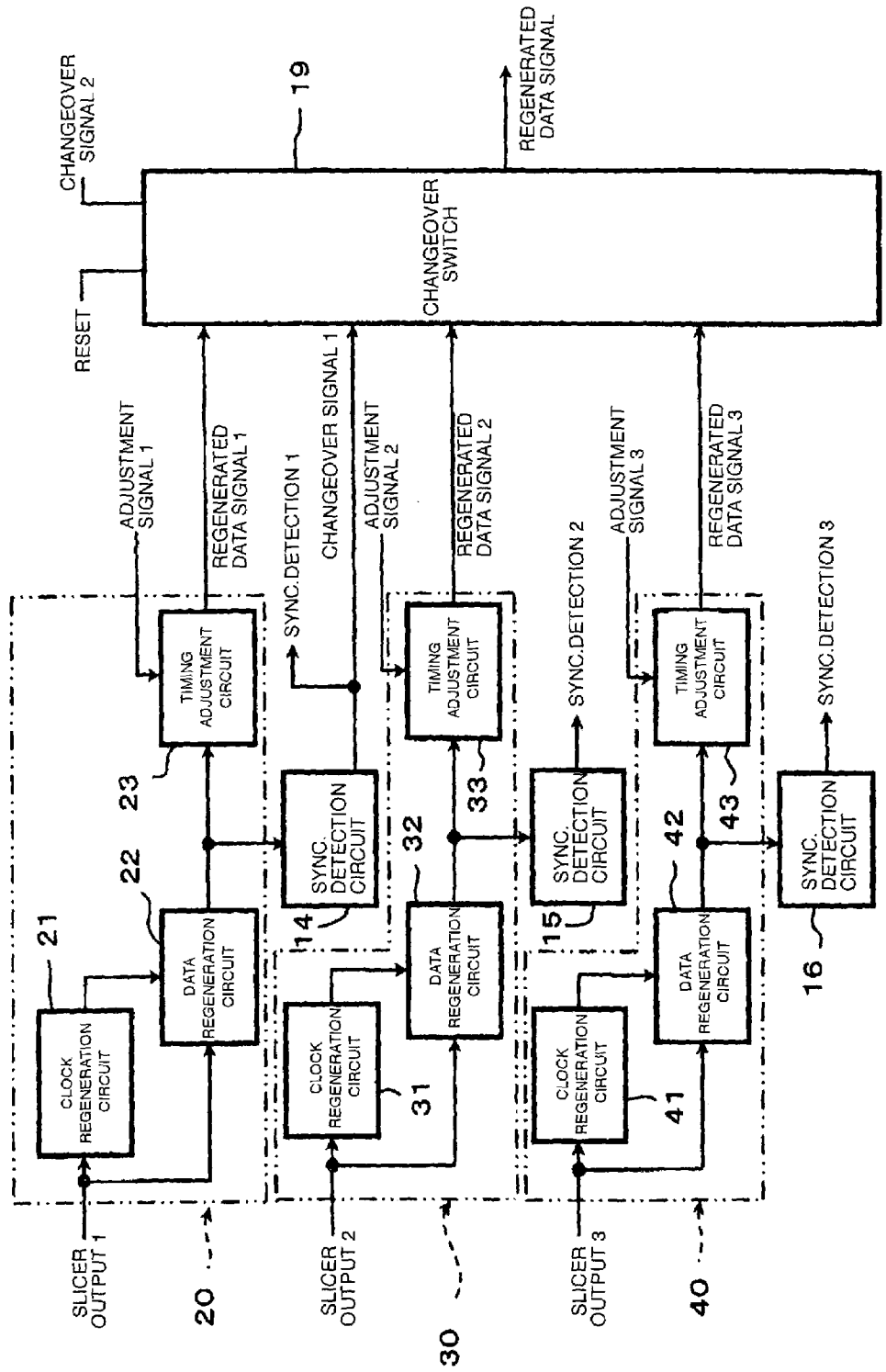

REGENERATED DATA SIGNAL GENERATION APPARATUS

BACKGROUND OF THE INVENTION

The invention relates to a regenerated data signal generation apparatus for use in a wireless receiving system, and more specifically, the invention is applicable to a regenerated data signal generation apparatus wherein a signal based on a received signal is binarized (sliced) by use of a predetermined DC level, and a regenerated data signal is generated on the basis of the signal as binarized.

With a receiver of a wireless communications system, a regenerated data signal is generated by binarizing (slicing) a detected signal (demodulated signal) obtained by demodulating a received signal at a predetermined reference level. The DC potential of the detected signal can undergo deviation for various reasons. For example, with a radio receiver receiving a FSK (Frequency Shift Keying) signal, the DC potential of a signal (detected signal) demodulated from the received signal can undergo deviation (offset deviation) due to effects of difference between signal frequency of the FSK signal and pre-specified frequency of a carrier wave, and so forth. Accordingly, in the process of generating the regenerated data signal, there is the need for compensating for the offset deviation occurring to the detected signal in order to obtain an accurate regenerated data signal.

Various techniques for compensating for the offset deviation of the detected signal have been conventionally proposed. For example, with a demodulator disclosed in U.S. Pat. No. 6,104,238, deviation in DC potential outputted from a detection circuit is suppressed by smoothing detection signals to thereby vary the center frequency thereof.

Further, with a data slicer disclosed in U.S. Pat. No. 5,412,692, an intermediate potential between the maximum level potential and the minimum level potential, detected from a detection output signal, is detected, and the detection output signal is binarized (sliced) by use of an intermediate potential level as a reference level. As a result, the reference level (the intermediate potential level) used for binarization of a detected signal will come to respond to deviation of the detection output signal, so that offset deviation of the detection output signal is compensated for.

Now, with the wireless communications system, a unit (for example, a frame) of a transmission signal generally comprises a data text part and a preamble part appended in front of the data text par. The preamble part is fixed in a predetermined pattern for every wireless communications system. The data text part is a part corresponding to data to be actually transmitted, and its pattern is dependent on the data to be transmitted. Accordingly, the data text part can include a pattern in which either low level bits or high level bits are continuous (successive identical codes pattern). In the case of the wireless communications system, there is specified a pattern length (tolerance for successive identical codes) of the successive identical codes pattern, ensuring demodulation without an error.

The pattern of the preamble part is decided upon for every wireless communications system as described in the foregoing, and from the viewpoint of efficiency of information transmission, the pattern length of the preamble part not containing objective data is preferably as short as possible. In the case of compensating for offset deviation of DC potential at the preamble part having such a short pattern length during the process of generating a regenerated data signal, operation for compensation needs to respond to deviation of DC potential of the signal at high speed.

Further, there can occur a case where a radio receiver receives transmission signals having a makeup of the above-described units (frames) in burst. For example, with a radio receiver (base station, mobile station) of a certain type of wireless communications system (mobile communications system), a transmitting condition and a receiving condition are on a time division basis (TDD: Time Division Duplex), and further, there is a case where a pause condition (neither the transmitting condition nor the receiving condition although a power supply voltage is applied to transmitting and receiving units) exists between changeovers besides the case where the transmitting condition and the receiving condition are changed over in succession. In such a case, when the radio receiver is changed over to the receiving condition, transmission signals arrive at the radio receiver in burst, whereupon DC potentials of detected signals at that point in time undergo dynamic deviation.

In such a case where changeover takes place from the pause condition to the receiving condition, the detected signals whose DC potentials undergo dynamic deviation rapidly rise, and consequently, particularly high speed is required of operation for compensation of deviation in DC potential at the preamble part of the detected signals.

Meanwhile, since the data text part is a part corresponding to the objective data, it is important in the process of generating a regenerated signal that the data text part satisfies the tolerance for successive identical codes, specified by the wireless communications system, and is insusceptible to effects of noises while it is stable in operation. These properties are generally contradictory to the operation for compensation of deviation in DC potential at high speed. Accordingly, with a regenerated data signal generation apparatus ensuring that the data text part is insusceptible to the effects of noises and stable in operation while satisfying the tolerance for successive identical codes, high-speed of operation for compensation of deviation in DC potential at the preamble part will be sacrificed.

With the demodulator disclosed in U.S. Pat. No. 6,104,238, for example, time required for compensation of deviation in DC potential is the sum of time required for smoothing the detection signals and absolute delay time of a channel selection filter and a detection circuit, so that it is difficult to effect high-speed compensation of deviation in DC potential in a circuit employing a high-order filter. Further, with the data slicer disclosed in U.S. Pat. No. 5,412,692, there is the need for reducing the time constant of an integrating circuit for detection of the maximum level potential and the minimum level potential as detected from the detection output signal in order to implement high-speed compensation of deviation in DC potential, however, in such a case, there occurs deterioration in the tolerance for successive identical codes. Accordingly, the time constant of the integrating circuit can not be reduced in any range other than that within which it is possible to secure a condition where the tolerance for successive identical codes, as specified by a wireless communications system, is satisfied.

SUMMARY OF THE INVENTION

The invention can provide a regenerated data signal generation apparatus capable of generating a regenerated data signal corresponding more accurately to various patterns from a signal corresponding to a received signal that can assume such patterns.

A regenerated data signal generation circuit of the present invention includes a receiving circuit, first and second binarization circuits and a signal preparation circuit. The receiving circuit receives a modulated signal and demodulates the modulated signal. The first binarization circuit receives the demodulated signal and binarizes the demodulated signal while compensates for offset deviation of the demodulated signal by a first method as to output a first binarization signal. The second binarization circuit receives the demodulated signal and binarizes the demodulated signal while compensates for offset deviation of the demodulated signal by a second method that is different from the first method so as to output a second binarization signal. The signal preparation receives the first and second binaraization signals and selectively outputs a regenerated data signal prepared from one of the binarization signals.

BRIEF DESCRIPTION OF THE DRAWINGS

FIG. 7 is a block diagram showing an example of a configuration of a wireless communications system comprising a second embodiment of a regenerated data signal generation apparatus according to the invention; and FIG. 8 is a block diagram showing an example of a configuration of a regenerated data signal generation circuit of the wireless communications system shown in FIG. 7.

PREFERRED EMBODIMENTS OF THE INVENTION

Preferred embodiments of the invention are described hereinafter with reference to the accompanying drawings.

Figure 1:
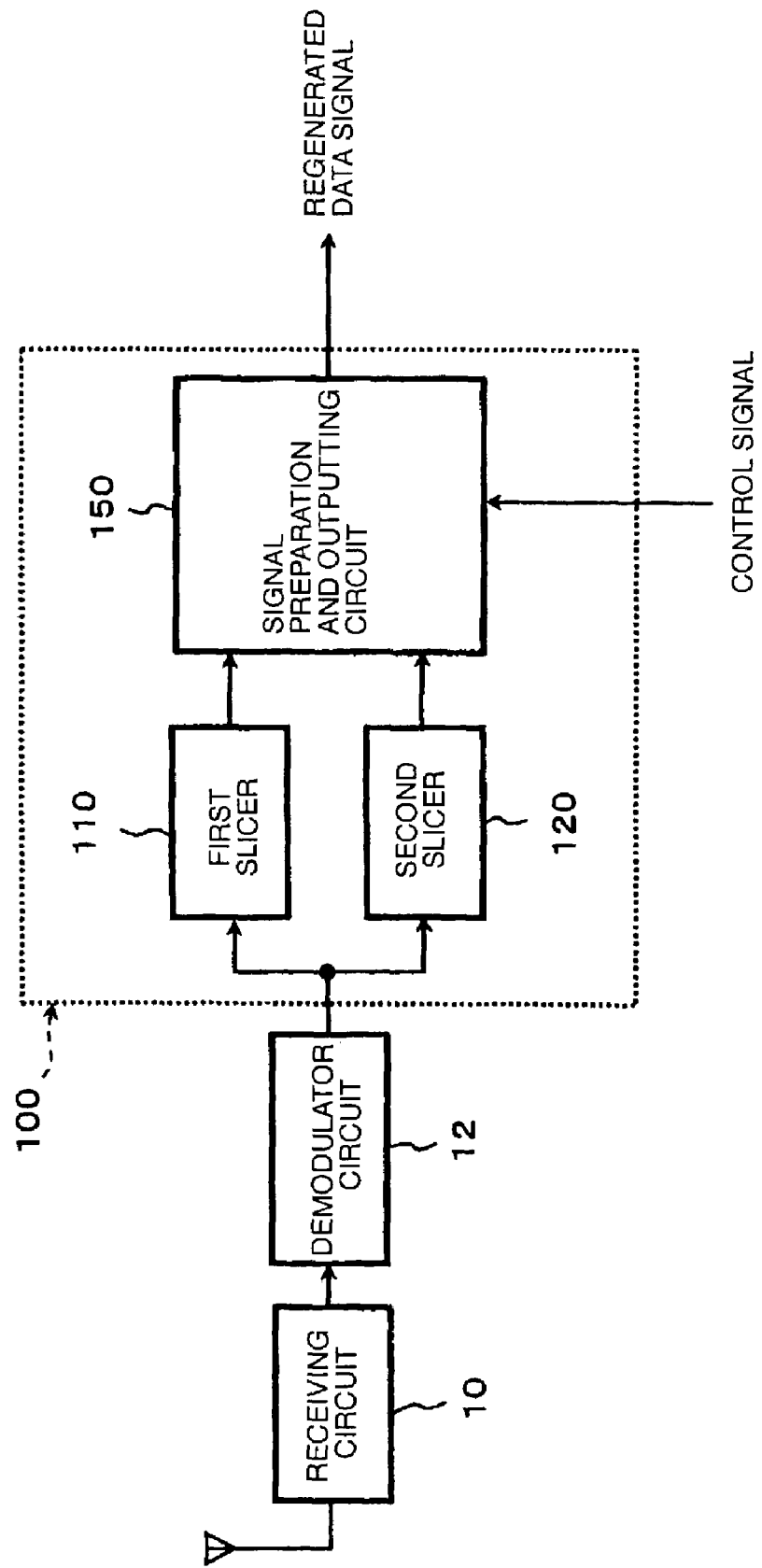
FIG. 1 is a block diagram showing an example of a configuration of a wireless communications system comprising a first embodiment of a regenerated data signal generation apparatus according to the invention.

FIG. 1 shows a configuration of a wireless communications system comprising a first embodiment of a regenerated data signal generation apparatus according to the invention.

The wireless communications system shown in FIG. 1 comprises a receiving circuit 10, a demodulator circuit 12, and a regenerated data signal generation circuit 100. The receiving circuit 10 receives a modulated signal corresponding to data to be transmitted and outputs a received signal. The demodulator circuit 12 demodulates the received signal in accordance with a demodulating algorithm corresponding to a modulating algorithm, and outputs a demodulated signal (detected signal).

The regenerated data signal generation circuit 100 comprises a first slicer (binarizing circuit) 110, a second slicer (binarizing circuit) 120, and a signal preparation and outputting circuit 150, receiving the demodulated signal from the demodulator circuit 12 as an input signal to thereby output a binary regenerated data signal corresponding to data for transmission from the input signal. The first slicer 110 and the second slicer 120 binarize the input signal while compensating for offset deviation of the input signal by use of different techniques, respectively.

The signal preparation and outputting circuit 150 selectively outputs a regenerated data signal prepared from either of two binary signals (slicer outputs 1, 2) outputted by the first slicer 110 and the second slicer 120 on the basis of a predetermined control signal. The regenerated data signal delivered from the signal preparation and outputting circuit 150 is fed to a digital processing circuit (omitted in the figure) provided in a back-end stage, and is converted into regenerated data in the digital processing circuit.

Figure 2:
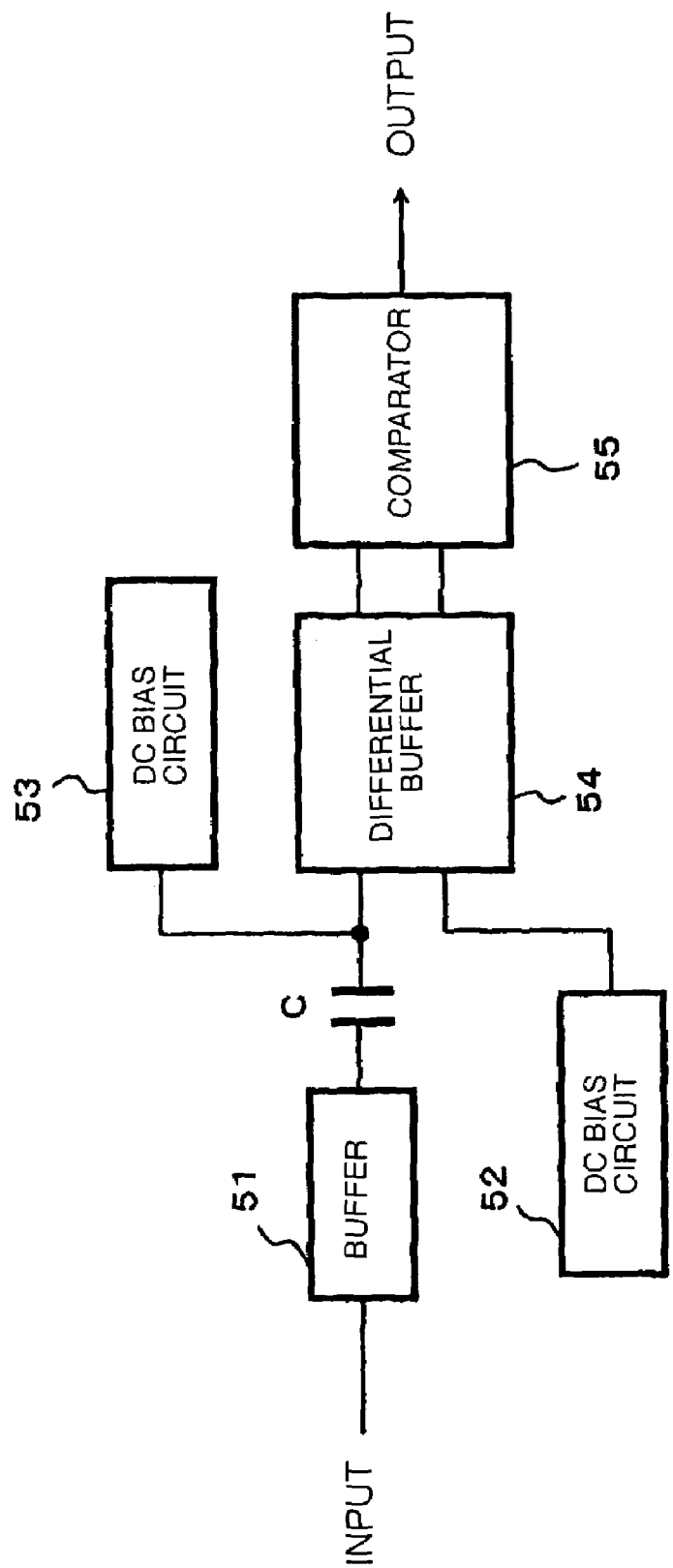
FIG. 2 is a view showing a first example of a binarizing circuit (slicer) having a function for compensating for offset deviation of an input signal.
Figure 3:
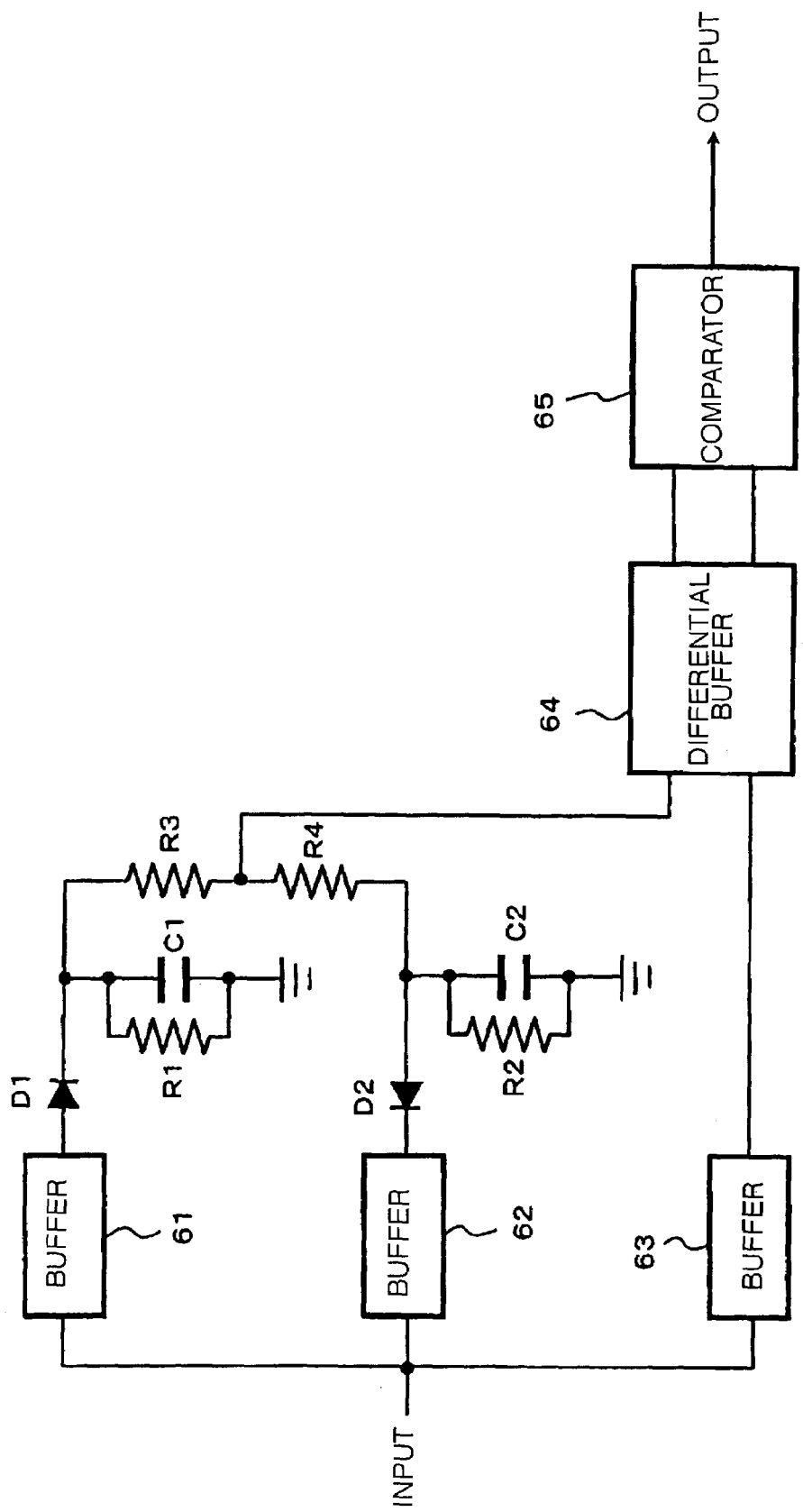
FIG. 3 is a view showing a second example of a binarizing circuit (slicer) having a function for compensating for offset deviation of an input signal.
Figure 4:
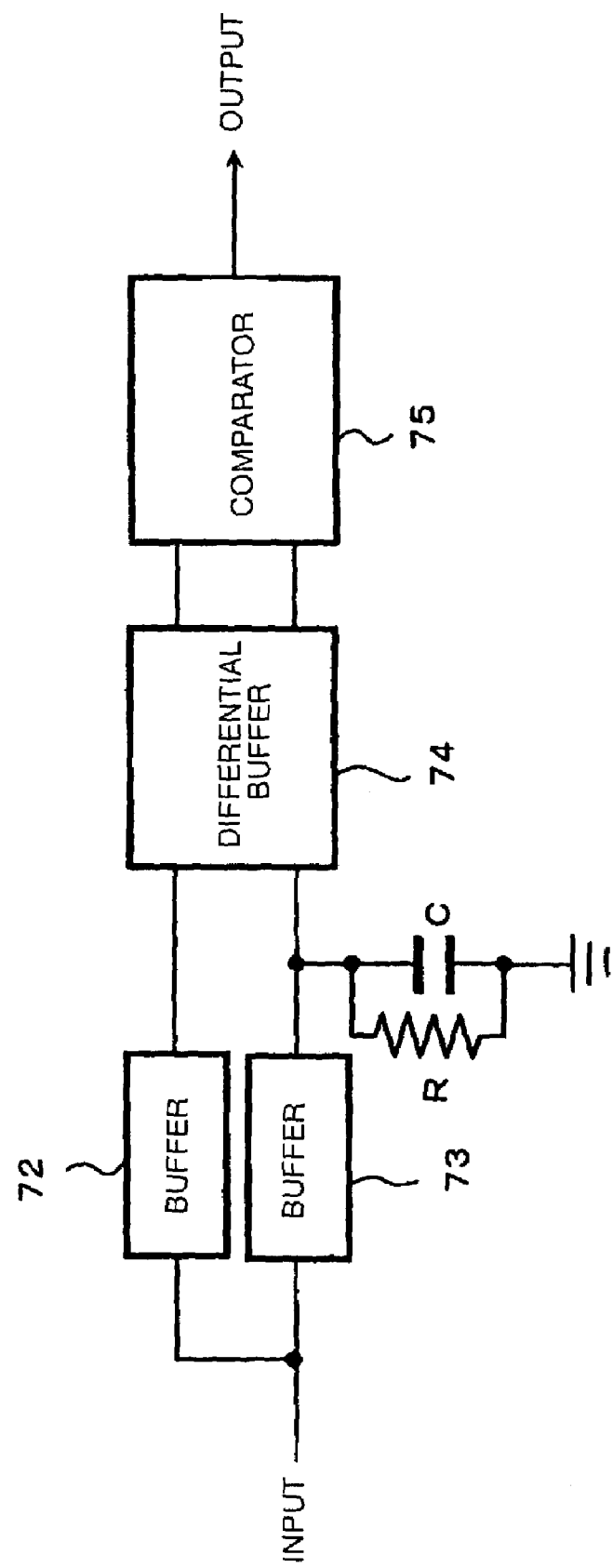
FIG. 4 is a view showing a third example of a binarizing circuit (slicer) having a function for compensating for offset deviation of an input signal.

A slicer that can be adopted as the first slicer 110 and the second slicer 120 is shown in, for example, FIGS. 2 to 4, respectively.

A slicer shown in FIG. 2 is a so-called differential type data slicer, and comprises a buffer 51, DC bias circuits 52, 53, a differential buffer 54, and a comparator 55. A DC potential from the DC bias circuit 52 is delivered to one of input terminals of the differential buffer 54 as a reference potential, and a potential obtained by superimposing an input signal level via the buffer 51 and a capacitor C on a DC potential from the DC bias circuit 53 is delivered to the other of the input terminals. Thereafter, the differential buffer 54 outputs a differential voltage corresponding to a difference between respective input potentials, and the differential voltage is delivered to the comparator 55.

With the slicer of such a configuration, on the leading edge of the input signals, the differential voltage from the differential buffer 54 responds to such a change and, turns, for example, plus, in response to which an output of the comparator 55 goes high level. On the other hand, on the trailing edge of the input signals, the differential voltage from the differential buffer 54 responds to such a change and, turns, for example, minus, in response to which an output of the comparator 55 goes the low level. As a result, even if the input signal contains offset deviation, a binary (high level and low level) signal (pulse signal) corresponding to the rising and falling of the input signal can be obtained as an output signal. That is, the slicer binarizes the input signal while compensating for the offset deviation.

A slicer shown in FIG. 3 is a so-called peak•bottom hold type data slicer. This slicer comprises buffers 61, 62, 63, a differential buffer 64, and a comparator 65 along with a first integrating circuit made up of a resistor R1 and a capacitor C1, and a second integrating circuit made up of a resistor R2 and a capacitor C2.

A diode D1 is connected between the buffer 61 and the first integrating circuit (R1, C1) such that the forward biased direction of the diode D1 is in agreement with a direction in which the buffer 61 heads toward the first integrating circuit (R1, C1). Further, a diode D2 is connected between the buffer 62 and the second integrating circuit (R2, C2) such that the forward biased direction of the diode D2 is in agreement with a direction in which the second integrating circuit (R2, C2) heads toward the buffer 61. Two resistors R3, R4 extends between the first integrating circuit (R1, C1) and the second integrating circuit (R2, C2). A differential voltage corresponding to a difference between a stored potential of the capacitor C1 of the first integrating circuit (R1, C1) and a stored potential of the capacitor C2 of the second integrating circuit (R2, C2) is divided by the resistors R3, R4, and a potential after such voltage division is delivered to one of input terminals of the differential buffer 64 as a reference potential. Further, an input signal potential is delivered to the other of the input terminals of the differential buffer 64 via the buffer 63.

As with the slicer shown in FIG. 2, the differential buffer 64 outputs a differential voltage corresponding to a difference between respective input potentials, and the differential voltage is delivered to the comparator 65.

With the slicer of such a configuration, in the process of an input signal being inputted sequentially to the three buffers 61, 62, 63 in parallel, peal values of the input signal are sequentially held in the capacitor C1 of the first integrating circuit (R1, C1) and bottom values of the input signal are sequentially held in the capacitor C2 of the second integrating circuit (R2, C2) by setting the circuit constant of the first integrating circuit (R1, C1) and the second integrating circuit (R2, C2), respectively, such that adequate charge/discharge characteristics can be obtained.

Further, by setting a resistance value of the resistor R3, and that of the resistor R4 to an identical value, an intermediate potential between the peal values of the input signal and the bottom values thereof is constantly delivered to one of the input terminals of the differential buffer 64 as a reference potential. If the input signal potential becomes higher than the intermediate potential between the peal values of the input signal and the bottom values thereof, the differential voltage sent out from the differential buffer 64 turns, for example, plus, in response to which an output of the comparator 55 goes high level. On the other hand, if the input signal potential becomes less than the intermediate potential between the peal values of the input signal and the bottom values thereof, the differential voltage sent out from the differential buffer 64 turns, for example, minus, in response to which an output of the comparator 65 goes low level. As a result, even if the input signal contain offset deviation, the intermediate potential between the peal values of the input signal and the bottom values thereof, serving as the reference potential, responds to the offset deviation, and consequently, the input signal is binarized while DC offset deviation of the input signal is compensated for.

A slicer shown in FIG. 4 is a so-called integration type data slicer. This slicer comprises buffers 72, 73, a differential buffer 74, and a comparator 75 along with an integrating circuit made up of a resistor R and a capacitor C. The integrating circuit (R, C) smoothes an input signal fed via the buffer 73, and a mean potential of the input signal is stored in the capacitor C. The mean potential of the input signal, stored in the capacitor C of the integrating circuit (R, C), is delivered to one of input terminals of the differential buffer 74 as a reference potential, and a potential of the input signal itself is delivered via the buffer 72 to the other of the input terminals.

As with the slicer shown in FIGS. 2 and 3, respectively, the differential buffer 74 outputs a differential voltage corresponding to a difference between respective input potentials, and the differential voltage is delivered to the comparator 75.

With the slicer of such a configuration, if the input signal potential becomes higher than the mean potential of the input signal, the differential voltage sent out from the differential buffer 74 turns, for example, plus, in response to which an output of the comparator 75 goes high level. On the other hand, the input signal potential becomes less than the mean potential of the input signal, the differential voltage sent out from the differential buffer 74 turns, for example, minus, in response to which an output of the comparator 75 goes the low level.

As a result, even if the input signal contain offset deviation, the mean potential of the input signal, serving as the reference potential, responds to the offset deviation, and consequently, the input signal is binarized while DC offset deviation of the input signal is compensated for.

The above described three slicers capable of binarizing the input signal while compensating for the offset deviation of the input signal by use of different techniques, respectively, have the following features.

First, with the so-called differential type data slicer shown in FIG. 2, the offset deviation of the input signal can be compensated for at the highest speed among the three slicers, however, tolerance for successive identical codes is very small. With the so-called peak•bottom hold type data slicer shown in FIG. 3, the offset deviation of the input signal can be compensated for at high speed and tolerance for successive identical codes is relatively large, however, it is susceptible to effects of noises, and inferior in stability of operation.

Further, the so-called integration type data slicer shown in the FIG. 4 is stable in operation while tolerance for successive identical codes can be increased, and is insusceptible to effects of noises, and further, to variations of circuit elements. However, this type of data slicer is inferior in respect of high speed of compensating operation for the offset deviation of the input signal.

Among the above-described three types of slicers, the so-called differential type data slicer shown in FIG. 2 or the so-called peak•bottom hold type data slicer shown in FIG. 3 is used for the first slicer 110 shown in FIG. 1. Further, the so-called integration type data slicer shown in the FIG. 4 is used for the second slicer 120 shown in FIG. 1.

Figure 5:
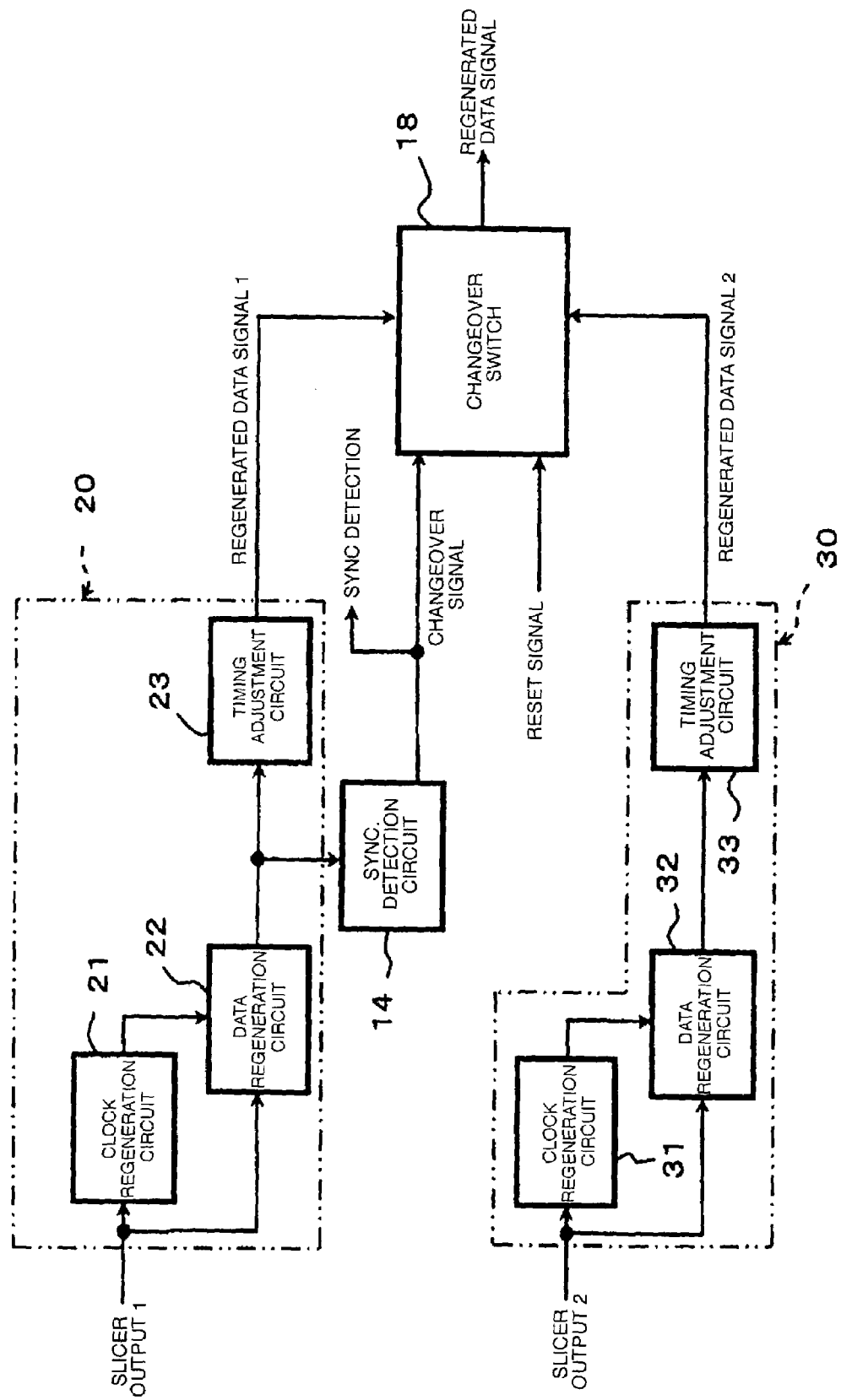
FIG. 5 is a block diagram showing a first example of a configuration of a regenerated data signal generation circuit of the wireless communications system shown in FIG. 1.

The signal preparation and outputting circuit 150 shown in FIG. 1 has a configuration shown in FIG. 5 by way of example.

In FIG. 5, the signal preparation and outputting circuit 150 comprises a first preparation circuit 20, a second preparation circuit 30, a sync. detection circuit 14, and a changeover switch 18. The first preparation circuit 20 comprises a clock regeneration circuit 21, a data regeneration circuit 22, and a timing adjustment circuit 23, and similarly, the second preparation circuit 30 comprises a clock regeneration circuit 31, a data regeneration circuit 32, and a timing adjustment circuit 33.

In the first preparation circuit 20, the clock regeneration circuit 21 and the data regeneration circuit 22 prepare the regenerated data signal to become a binary signal synchronized with a predetermined clock from the binary signal (slicer output 1) fed with phase in unstable condition from the first slicer 110 (refer to FIG. 1). The clock regeneration circuit 21 is made up of, for example, PLL, and extracts a stable clock component from the slicer output 1 (binary signal), thereby outputting a clock signal corresponding to the stable clock component. The data regeneration circuit 22 executes retiming of the slicer output 1 on the basis of the clock signal from the clock regeneration circuit 21, and generates the regenerated data signal to become the binary signal synchronized with the clock signal.

The timing adjustment circuit 23 is made up of a delay circuit, and causes the regenerated data signal from the data regeneration circuit 22 to be delayed by a predetermined timing, thereby sending out the same as a regenerated data signal 1 to the changeover switch 18.

As with the case of the first preparation circuit 20, in the second preparation circuit 30 as well, the clock regeneration circuit 31 and the data regeneration circuit 32 prepare the regenerated data signal to become a binary signal synchronized with a predetermined clock from the binary signal (slicer output 2) fed by the second slicer 120 (refer to FIG.

1). Then, the regenerated data signal is delayed by a predetermined timing through the timing adjustment circuit 33, and is sent out to the changeover switch 18 as a regenerated data signal 2.

A delay amount (time) at the timing adjustment circuit 23 of the first preparation circuit 20, and a delay amount at the timing adjustment circuit 33 of the second preparation circuit 30 are preset such that phase difference between the slicer output 1 from the first slicer 110, and the slicer output 2 from the second slicer 120 is made up for to thereby render the phase of the regenerated data signal 1 identical to the phase of the regenerated data signal 2 at input parts of the changeover switch 18.

Upon detection of a synchronizing bit strings (Sync.) placed at the head in front of a data text part (data packet group) included in a transmission signal, the sync detection circuit 14 outputs a sync. detection signal. The sync. detection signal is fed to a digital processing circuit (omitted in the figure) provided in a back-end stage as a synchronizing signal for detection of data, and also to the changeover switch 18 as a changeover signal.

The changeover switch 18 receives a reset signal from a control unit (omitted in the figure) of the wireless receiving system, and the changeover signal (the sync. detection signal) from the sync detection circuit 14 that are to serve as control signals. Subsequently, the changeover switch 18 selectively outputs either the regenerated data signal 1 delivered from the first preparation circuit 20 or the regenerated data signal 2 delivered from the second preparation circuit 30 on the basis of an input condition of the control signals (the reset signal, the changeover signal (the sync. detection signal)).

During a receiving operation of the wireless receiving system described, the reset signal from the control unit is fed to the changeover switch 18 in the initial state. In response to the reset signal, the changeover switch 18 outputs the regenerated data signal 1 delivered from the first preparation circuit 20 as a final regenerated data signal. That is, the regenerated data signal 1 prepared from the binary signal (slicer output 1) fed from the first slicer 110 is sent out from the signal preparation and outputting circuit 150 as the final regenerated data signal.

In the initial state of the receiving operation, the receiving circuit 10 receives a preamble part in a predetermined pattern, appended in front of the data text part. Accordingly, in the process of the preamble part being received, the final regenerated data signal is prepared from the binary signal (slicer output 1) fed from the first slicer 110, which is either the so-called differential type data slicer (refer to FIG. 2) or the so-called peak•bottom hold type data slicer, capable of effecting the compensating operation for the offset deviation of the input signal at high speed.

Thus, in the process of receiving the preamble part, while compensation for offset deviation of a demodulated signal is being executed at high speed by the first slicer 110, the final regenerated data signal is prepared from the slicer output 1 obtained by binarizing the demodulated signal, so that the final regenerated data signal will correspond more accurately to the pattern of the preamble part.

In the process of the receiving operation described, the receiving circuit 10 starts receiving the data text part succeeding the preamble part, and upon detection of the synchronizing bit strings (Sync.) placed at the head in front of the data text part by the sync detection circuit 14, the sync. detection signal from the sync detection circuit 14 is fed to the changeover switch 18 as the changeover signal. The changeover switch 18 changes over the final regenerated data signal to be outputted in response to the changeover signal from the regenerated data signal 1 to the regenerated data signal 2 from the second preparation circuit 30. That is, as a result of such changeover, the regenerated data signal prepared from the binary signal (slicer output 2) fed from the second slicer 120 is sent out from the signal preparation and outputting circuit 150 as the final regenerated data signal.

Due to a delaying action by the timing adjustment circuit 23 of the first preparation circuit 20, and the timing adjustment circuit 33 of the second preparation circuit 30, respectively, the regenerated data signal 1 and the regenerated data signal 2, in an identical phase, are fed to the input parts of the changeover switch 18. Accordingly, even though the final regenerated data signal is changed over from the regenerated data signal 1 of the first preparation circuit 20 to the regenerated data signal 2 of the second preparation circuit 30 as described above, no phase deviation occurs to the final regenerated data before and after the changeover.

In the process of receiving the data text part (data packet group) succeeding the preamble part, the final regenerated data signal is prepared from the binary signal (slicer output 2) fed from the second slicer 120, which is the so-called integration type data slicer shown in the FIG. 4, having a large tolerance for successive identical codes, insusceptible to effects of noises, excellent in stability of operation and in addition, insusceptible to variations of circuit elements. Thus, in the process of receiving the data text part, the final regenerated data signal is prepared from the slicer output 2 obtained by stably binarizing the demodulated signal in the second slicer 120, and consequently, the final regenerated data signal corresponds more accurately to bit strings of the respective packets contained in the data text part.

Upon completion of processing with respect to the last packet of the data text part, the control unit sends out the reset signal to the changeover switch 18. As with the case of the previously described initial state, the changeover switch 18 changes over the final regenerated data signal to be outputted in response to the reset signal from the regenerated data signal 2 fed from the second preparation circuit 30 to the regenerated data signal 1 fed from the first preparation circuit 20. As a result, with respect to a preamble part of the next unit (frame) of the transmission signal, a regenerated data signal 1 prepared from a binary signal (slicer output 1) fed from the first slicer 110 is sent out from the signal preparation and outputting circuit 150 as a final regenerated data signal.

Thus, in the process of receiving the transmission signal made up of the preamble parts and the data text parts, alternately arranged, as for the preamble parts, the regenerated data signal 1 prepared from the binary signal (slicer output 1) fed from the first slicer 110, capable of effecting the compensating operation for the offset deviation of the input signal at high speed, and as for the data text part, the regenerated data signal 2 prepared from the binary signal (slicer output 2) fed from the second slicer 120 capable of executing stable binarizing operation, are sent out from the regenerated data signal generation circuit 100,as the final regenerated data signal, respectively. Accordingly, with respect to both the preamble parts and the data text parts, it becomes always possible to obtain the regenerated data signal corresponding more accurately to data pattern (bit strings) of the transmission signal FIG. 6 shows a second example of the signal preparation and outputting circuit 150.

With a signal preparation and outputting circuit 150 according to the second example, phase lag between two regenerated data signals 1, 2 can be compensated for. In FIG.

6, parts corresponding to those in FIG. 5 are denoted by like reference numerals, omitting detailed description thereof.

Figure 6:
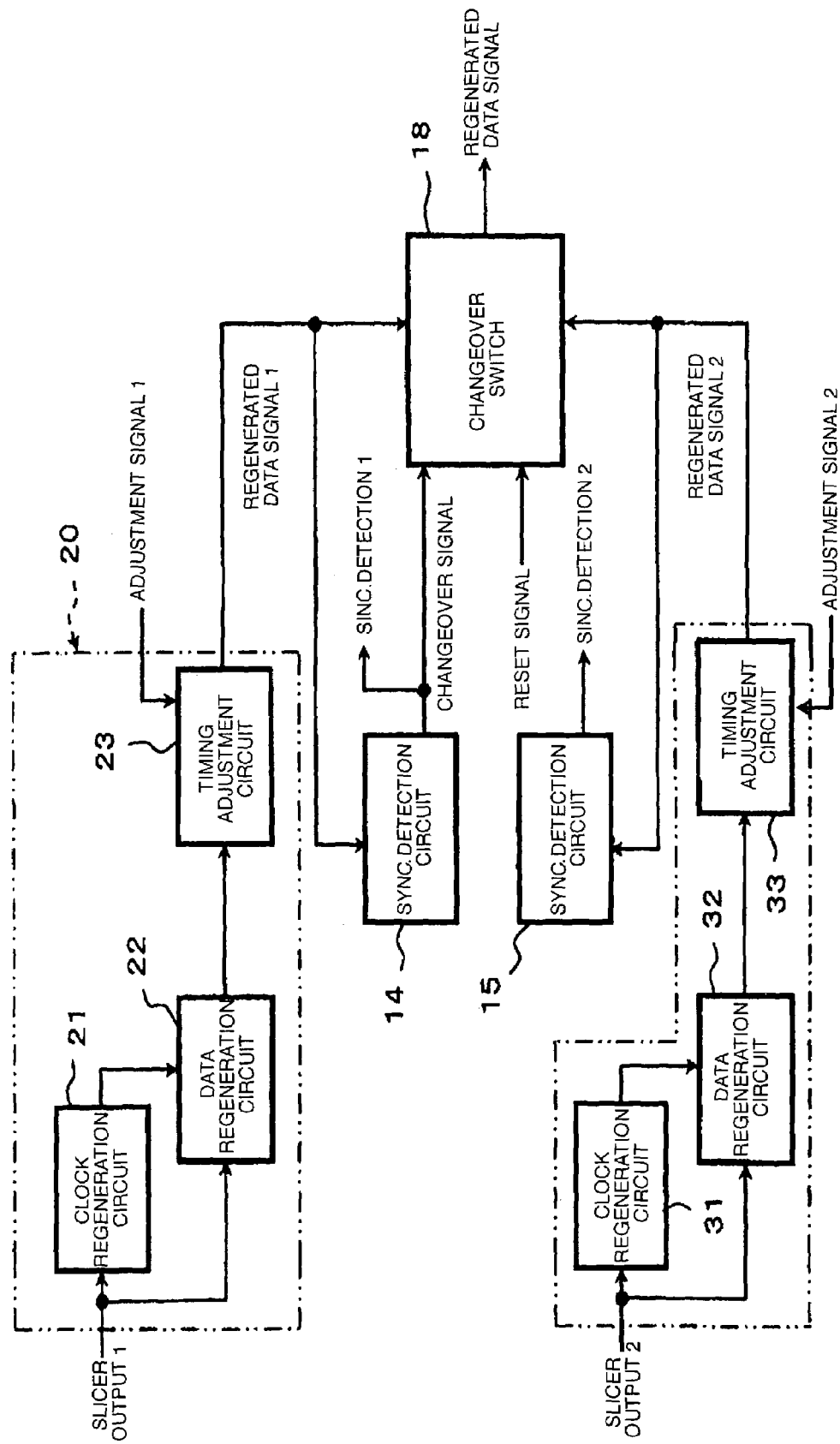
FIG. 6 is a block diagram showing a second example of a configuration of a regenerated data signal generation circuit of the wireless communications system shown in FIG. 1.

The signal preparation and outputting circuit 150 shown in FIG. 6 comprises a sync. detection circuit 15 for outputting a sync. detection signal 2 upon detection of a synchronizing bit strings (Sync.) placed at the head in front of a data text part from the regenerated data signal 2 fed from a second preparation circuit 30. Further, a sync. detection circuit 14 outputs a sync. detection signal 1 upon detection of a synchronizing bit strings (Sync.) placed at the head in front of a data text part from the regenerated data signal 1 fed from a first preparation circuit 20. A timing adjustment circuit 23 of the first preparation circuit 20 is able to change a delay amount thereof by the action of an adjustment signal 1 from a control unit while a timing adjustment circuit 33 of the second preparation circuit 30 is able to change a delay amount thereof by the action of an adjustment signal 2 from the control unit.

With the use of the signal preparation and outputting circuit 150 of such a configuration as described, the control unit receives the sync. detection signal 1 from the sync. detection circuit 14 and the sync. detection signal 2 from the sync. detection circuit 15. The control unit controls the delay amount of the timing adjustment circuit 23 of the first preparation circuit 20, and that of the timing adjustment circuit 33 of the second preparation circuit 30 by the action of the adjustment signal 1 and the adjustment signal 2, respectively, such that input timing of the sync. detection signal 1 is rendered identical to that of the sync. detection signal 2.

The configuration described above enables the phase of the regenerated data signal 1 from the first preparation circuit 20, and that of the regenerated data signal 2 from the second preparation circuit 30 to be individually adjusted, thereby enabling phase lag between the regenerated data signal 1 and the regenerated data signal 2 to be corrected.

FIG. 7 shows a configuration of a wireless communications system comprising a second embodiment of a regenerated data signal generation apparatus according to the invention.

The wireless communications system shown in FIG. 7 comprises a receiving circuit 10, a demodulator circuit 12, and a regenerated data signal generation circuit 100 as with the communications system shown in FIG. 1.

In the case of an example shown in FIG. 1, the regenerated data signal generation circuit 100 comprises two slicers (the first slicer 110 and the second slicer 120), however, the regenerated data signal generation circuit 100 according to the present embodiment comprises three slicers, namely, a first slicer 110, a second slicer 120, and a third slicer 130 as well as a signal preparation and selection circuit 160.

For the first slicer 110, the so-called differential type data slicer shown in FIG. 2, for example, is used, and for second slicer 120, the so-called peak•bottom hold type data slicer shown in FIG. 3, for example, is used. Further, for the third slicer 130, the so-called integration type data slicer shown in FIG. 4, for example, is used. The signal preparation and selection circuit 160 selectively outputs on the basis of a control signal a regenerated data signal prepared from any of three binary signals (slicer outputs 1, 2, 3) sent out from the first slicer 110, the second slicer 120, and the third slicer 130, respectively.

The signal preparation and selection circuit 160 has a configuration shown in FIG. 8 by way of example.

In FIG. 8, the signal preparation and selection circuit 160 comprises a first preparation circuit 20 for preparing a regenerated data signal 1 from a binary signal (slicer output 1) fed from the first slicer 110, and outputting the same, a second preparation circuit 30 for preparing a regenerated data signal 2 from a binary signal (slicer output 2) fed from the second slicer 120, and outputting the same, and a third preparation circuit 40 for preparing a regenerated data signal 3 from a binary signal (slicer output 3) fed from the third slicer 130, and outputting the same. Further, the signal preparation and selection circuit 160 comprises a changeover switch 19 for selecting any of the regenerated data signals 1, 2, 3, sent out from the first preparation circuit 20, the second preparation circuit 30, and the third preparation circuit 40, respectively, as a final regenerated data signal, and outputting the same.

As with the previously described example (refer to FIGS. 5 and 6), the first preparation circuit 20, the second preparation circuit 30, and the third preparation circuit 40 comprise clock regeneration circuits 21, 31, 41, data regeneration circuits 22, 32, 42, and timing adjustment circuits 23, 33, 43, respectively, and prepare the regenerated data signals 1, 2, 3, to be turned into binary signals synchronized with a predetermined clock from the previously described binary signals with phase in unstable condition (the slicer outputs), respectively.

Further, the signal preparation and selection circuit 160 comprises a sync detection circuit 14 for outputting a sync. detection signal 1.

upon detection of a synchronizing bit strings (Sync.) in a regenerated data signal from the data regeneration circuit 22 of the first preparation circuit 20, a sync detection circuit 15 for outputting a sync. detection signal 2 upon detection of a synchronizing bit strings (Sync.) in a regenerated data signal from the data regeneration circuit 32 of the second preparation circuit 30, and a sync detection circuit 16 for outputting a sync. detection signal 3 upon detection of a synchronizing bit strings (Sync.) in a regenerated data signal from the data regeneration circuit 42 of the third preparation circuit 40. A control unit (omitted in the figure) controls a delay amount of the timing adjustment circuits 23, 33, 43 of the respective preparation circuits 20, 30, 40 by the action of adjustment signals 1, 2, 3, corresponding to output timing of the sync. detection signal from the respective sync detection circuits 14, 15, 16 such that the regenerated data signals 1, 2, 3, sent out from the respective preparation circuits 20, 30, 40 are fed with an identical phase to an input part of the changeover switch 19.

The changeover switch 19 receives a changeover signal 1 which is the sync. detection signal 1 from the sync. detection circuit 14, and a reset signal as well as a changeover signal 2 from the control unit as control signals, selectively outputting any of the regenerated data signals 1, 2, 3 in response to an input condition of the control signals.

The operation of the regenerated data signal generation circuit 100 of the above-described configuration is as follows.

First, in the initial state of a receiving operation, and upon completion of a receiving process with respect to a transmission unit (for example, frame) of a transmission signal, the reset signal from the control unit is fed to the changeover switch 19, whereupon the changeover switch 19 outputs the regenerated data signal 1 from the first preparation circuit 20 as a final regenerated data signal. In this case, in the process of receiving the preamble part placed at the head of the transmission unit (for example, frame) of the transmission signal, while compensation for offset deviation of a demodulated signal is being effected at high speed by the first slicer 110 (the differential type data slicer: refer to FIG. 2), the final regenerated data signal (the regenerated data signal 1) is prepared from the slicer output 1 obtained by binarizing the demodulated signal. Accordingly, the final regenerated data signal comes to correspond more accurately to a pattern of the preamble part.

In the process of the receiving operation, upon starting to receive a data text part succeeding the preamble part, the sync detection circuit 14 detects the synchronizing bit strings (Sync.), and outputs the sync. detection signal 1, whereupon the changeover switch 19 receiving the sync. detection signal 1 as the changeover signal 1 changes over the regenerated data signal to be outputted from the regenerated data signal 1 from the first preparation circuit 20 to the regenerated data signal 2 from the second preparation circuit 30. By controlling the delay amount at the timing adjustment circuit 23 of the first preparation circuit 20, and the timing adjustment circuit 33 of the second preparation circuit 30, respectively, occurrence of phase deviation before and after the changeover is prevented, and thereafter, the regenerated data signal 2 from the second preparation circuit 30 is sent out as the final regenerated data signal.

In this case, during the process for receiving the data text part of the transmission signal, the final regenerated data signal (the regenerated data signal 2) is prepared from the binary signal (slicer output 2) fed from the second slicer 120, which is the peak•bottom hold type data slice (refer to FIG. 3) excellent in tolerance for successive identical codes. Accordingly, even if bit strings of successive identical codes are placed at the head of the data text part, the final regenerated data signal will correspond more accurately to the bit strings.

Upon completion of the process for receiving a predetermined number of packets, the control unit delivers the changeover signal 2 to the changeover switch 19. The changeover switch 19 receiving the changeover signal 2 as one of the control signals changes over the final regenerated data signal to be outputted from the regenerated data signal 2 from the second preparation circuit 30 to the regenerated data signal 3 from the second preparation circuit 40. By controlling the delay amount at the timing adjustment circuit 33 of the second preparation circuit 30, and the timing adjustment circuit 43 of the third preparation circuit 40, respectively, occurrence of phase deviation before and after the changeover is prevented, and thereafter, the regenerated data signal 3 from the third preparation circuit 40 is sent out as the final regenerated data signal.

In this case, during the process for receiving the data text part of the transmission signal, the final regenerated data signal (the regenerated data signal 3) is prepared from the binary signal (slicer output 3) fed from the third slicer 130, which is the integration type data slicer insusceptible to effects of noises and excellent in stability of operation. Accordingly, even if bit strings of successive identical codes are placed at the head of the data text part, the final regenerated data signal will correspond more accurately to the bit strings of respective packets contained in the data text part, placed after the head thereof.

Thus, in the process of receiving the transmission signal made up of the preamble parts and the data text parts, alternately arranged, as for the preamble parts, the regenerated data signal 1, prepared from the binary signal (slicer output 1) fed from the first slicer 110, capable of effecting the compensating operation for the offset deviation of the input signal at high speed, as for the head of the data text part, the regenerated data signal 2, prepared from the binary signal (slicer output 2) fed from the second slicer 120 excellent in the tolerance for successive identical codes, and further, as for portions of the data text part, other than the head, the regenerated data signal 3, prepared from the binary signal (slicer output 3) fed from the third slicer 130 capable of performing a stable binarizing operation, are sent out from the regenerated data signal generation circuit 100 as the final regenerated data signal, respectively. Accordingly, even in the case of receiving operation in accordance with the wireless communications protocol wherein the bit strings of successive identical codes are placed at the head of the data text part, in particular, it becomes always possible to obtain the regenerated data signal corresponding more accurately to a data pattern (bit strings) of the transmission signal with respect to both the preamble parts and the data text parts.

Now, according to the respective embodiments described hereinbefore, the signal preparation and outputting circuit 150 comprises the first preparation circuit 20 and the second preparation circuit 30, corresponding to the respective slicers 110, 120, and the signal preparation and selection circuit 160 comprises the first preparation circuit 20, the second preparation circuit 30, and the third preparation circuit 40, corresponding to the respective slicers 110, 120, 130, however, one preparation circuit may be utilized by a plurality of slicers on a time division basis. In such a case, slicer outputs to be delivered to the preparation circuit are to be changed over by a changeover switch 18 (19).

With the embodiments described hereinbefore, use of the three types of the slicers is described, however, other types of slicers maybe used instead. Further, the signal preparation and outputting circuits 150, 160 may have a configuration such that a regenerated data signal prepared from any of more than three slicer outputs is selectively outputted.

As described in the foregoing, with the invention, it is possible to generate a regenerated data signal prepared from a plurality of types of binary signals obtained through binarization while compensating for offset deviation with respect to a plurality of parts of a signal corresponding to a received signal by use of different techniques, respectively. Hence, on the basis of a signal corresponding to a received signal which can assume various patterns, the regenerated data signal corresponding more accurately to the patterns can be generated.

What is claimed is:

1. A regenerated data signal generation circuit comprising:
   a receiving circuit for receiving a modulated signal and demodulating the modulated signal so as to output a demodulated signal;
   a first binarization circuit connected to the receiving circuit, the first binarization circuit receiving the demodulated signal and binarizing the demodulated signal while compensating for offset deviation of the demodulated signal by a first method so that the first binarization circuit outputs a first binarization signal;
   a second binarization circuit connected to the receiving circuit, the second binarization circuit receiving the demodulated signal and binarizing the demodulated signal while compensating for offset deviation of the demodulated signal by a second method that is different from the first method so that the second binarization circuit outputs a second binarization signal;
   a first preparation circuit coupled to the first binarization circuit, the first preparation circuit outputting a first regenerated data signal and a first delayed regenerative data signal based on the first binarization signal;
   a second preparation circuit coupled to the second binarization circuit, the second preparation circuit generating a second regenerated data signal and outputting a delayed regenerative data signal based on the second binarization signal;

a synchronous detection circuit coupled to the first preparation circuit so as to output a changeover signal based on the first generated data signal; and a switch circuit coupled to the first and second preparation circuit and the synchronous detection circuit so as to output either the first delayed regenerative data signal or the second delayed regenerative data signal in response to the changeover signal.

2. A regenerated data signal generation circuit according to claim 1, wherein the first binarization circuit is a differential type data slicer and the second binarization circuit is a peak-bottom hold type data slicer.

3. A regenerated data signal generation circuit according to claim 1, wherein the first binarization circuit is a differential type data slicer and the second binarization circuit is an integration type data slicer.

4. A regenerated data signal generation circuit according to claim 1, wherein the first binarization circuit is a peak-bottom hold type data slicer and the second binarization circuit is an integration type data slicer.

5. A regenerated data signal generation circuit according to claim 1, wherein the first preparation circuit includes:

a first clock regeneration circuit coupled to the first binarization circuit, the first clock regeneration circuit outputting a first regenerated clock signal based on the first binarization signal;

a first data regeneration circuit coupled to the first binarization circuit and the first clock regeneration circuit, the first data regeneration circuit outputting the first regenerated data signal based on the first binarization signal and the first regenerated clock signal;

a first timing adjustment circuit coupled to the first data regeneration circuit the first timing adjustment circuit outputting the first delayed regenerative signal based on the first regenerated data signal, wherein the second preparation circuit includes:

a second clock regeneration circuit coupled to the second binarization circuit, the second clock regeneration circuit outputting a second regenerated clock signal based on the second binarization signal;

a second data regeneration circuit coupled to the second binarization circuit and the second clock regeneration circuit, the second data regeneration circuit outputting the second regenerated data signal based on the second binarization signal and the second regenerated clock signal;

a second timing adjustment circuit coupled to the second data regeneration circuit, the second timing adjustment circuit outputting the second delayed regenerative signal based on the second regenerated data signal.

6. A regenerated data signal generation circuit according to claim 1, wherein the receiving circuit includes a receiver circuit for receiving the modulated signal and a demodulator circuit for demodulating the modulated signal.

7. A regenerated data signal generation circuit comprising:

a receiving circuit for receiving a modulated signal and demodulating the modulated signal so as to output a demodulated signal;

a first binarization circuit connected to the receiving circuit the first binarization circuit receiving the demodulated signal and binarizing the demodulated signal while compensating for offset deviation of the demodulated signal by a first method so that the first binarization circuit outputs a first binarization signal;

a second binarization circuit connected to the receiving circuit, the second binarization circuit receiving the demodulated signal and binarizing the demodulated signal while compensating for offset deviation of the demodulated signal by a second method that is different from the first method so that the second binarization circuit outputs a second binarization signal; and a signal preparation circuit connected to the first and second binarization circuits, the signal preparation circuit receiving the first and second binarization signals and selectively outputting a delayed regenerative data signal prepared from one of the binarization signals;

wherein the first binarization circuit is a differential type data slicer which includes;

a buffer coupled for receiving the demodulated signal;

a capacitor connected to the buffer;

a first DC bias circuits connected to the capacitor;

a second DC bias circuits;

a differential buffer having a first input connected to the capacitor and a second input connected to the second DC bias circuit and first and second outputs; and a comparator connected to the first and second outputs of the differential buffer for outputting the first binarization signal.

8. A regenerated data signal generation circuit comprising:

a receiving circuit for receiving a modulated signal and demodulating the modulated signal so as to output a demodulated signal;

a first binarization circuit connected to the receiving circuit, the first binarization circuit receiving the demodulated signal and binarizing the demodulated signal while compensating for offset deviation of the demodulated signal by a first method so that the first binarization circuit outputs a first binarization signal;

a second binarization circuit connected to the receiving circuit, the second binarization circuit receiving the demodulated signal and binarizing the demodulated signal while compensating for offset deviation of the demodulated signal by a second method that is different from the first method so that the second binarization circuit outputs a second binarization signal;

a third binarization circuit connected to the receiving circuit, the third binarization circuit receiving the demodulated signal and binarizing the demodulated signal while compensating for offset deviation of the demodulated signal by a third method that is different from the first and second methods so that the third binarization circuit outputs a third binarization signal; and a signal preparation circuit connected to the first, second and third binarization circuits, the signal preparation circuit receiving the first, second and third binarization signals and selectively outputting a regenerated data signal prepared from one of the binarization signals.

9. A regenerated data signal generation circuit according to claim 8, wherein the first binarization circuit is a differential type data slicer, the second binarization circuit is a peak-bottom hold type data slicer and the third binarization circuit is an integration type data slicer.

10. A regenerated data signal generation circuit according to claim 9, wherein the differential type data slicer includes:
- a buffer coupled for receiving the demodulated signal;
- a capacitor connected to the buffer;
- a first DC bias circuits connected to the capacitor;
- a second DC bias circuits;
- a differential buffer having a first input connected to the capacitor and a second input connected to the second DC bias circuit and first and second outputs; and
- a comparator connected to the first and second outputs of the differential buffer for outputting the first binarization signal.

11. A regenerated data signal generation circuit according to claim 8, wherein the signal preparation circuit includes:
- first to third clock regeneration circuits each of which is coupled for receiving the first to third binarization signals, respectively, the first to third clock regeneration circuits outputting first to third regenerated clock signals, respectively;
- first to third data regeneration circuits each of which is coupled for receiving the first to third binarization signals and the first to third regenerated clock signals, respectively, the first to third data regeneration circuits outputting first to third regenerated data signals, respectively;
- first to third timing adjustment circuits coupled for receiving the first to third regenerated data signals, respectively;
- a synchronous detection circuit coupled for receiving one of the regenerated data signals and outputting a changeover signal; and
- a switch circuit coupled for receiving the first to third regenerated data signals from the timing adjustment circuits and the changeover signal, the switch circuit selects and outputs one of the regenerated data signals in response to the changeover signal.

12. A regenerated data signal generation circuit according to claim 8, wherein the receiving circuit includes a receiver circuit for receiving the modulated signal and a demodulator circuit for demodulating the modulated signal.

13. A regenerated data signal generation circuit comprising:
- a receiving circuit for receiving a modulated signal and demodulating the modulated signal into a demodulated signal;
- a first slicer coupled for receiving the demodulated signal and binarizing the demodulated signal while compensating for offset deviation of the demodulated signal by a first method so that the first slicer outputs a first binarization signal;
- a second slicer coupled for receiving the demodulated signal and binarizing the demodulated signal while compensating for offset deviation of the demodulated signal by a second method that is different from the first method so that the second slicer outputs a second binarization signal; and
- a first preparation circuit coupled to the first slicer, the first preparation circuit outputting a first regenerated data signal and a first delayed regenerative data signal based on the first binarization signal;
- a second preparation circuit coupled to the second slicer, the second preparation circuit generating a second regenerated data signal and outputting a delayed regenerative data signal based on the second binarization signal;
- a synchronous detection circuit coupled to the first preparation circuit so as to output a changeover signal based on the first generated data signal and a switch circuit coupled to the first and second preparation circuit and the synchronous detection circuit so as to output either the first delayed regenerative data signal or the second delayed regenerative data signal in response to the changeover signal.

14. A regenerated data signal generation circuit according to claim 13, wherein the first slicer is a differential type data slicer and the second slicer is a peak-bottom hold type data slicer.

15. A regenerated data signal generation circuit according to claim 13, wherein the first slicer is a differential type data slicer and the second slicer is an integration type data slicer.

16. A regenerated data signal generation circuit according to claim 13, wherein the first slicer is a peak-bottom hold type data slicer and the second slicer is an integration type data slicer.

17. A regenerated data signal generation circuit according to claim 13, wherein the first preparation circuit includes:
- a first clock regeneration circuit, coupled to the first slicer, which outputs a first regenerated clock signal based on the first binarization;
- a first data regeneration circuit coupled to the first slicer and the first clock regeneration circuit, which outputs the first regenerated data signal based on the first binarization signal and the first regenerative clock signal;
- a first timing adjustment circuit, coupled to the first data regeneration circuit, which outputs the first delayed regenerative signal based on the first regenerated data signal;
- wherein the second preparation circuit includes;
- a second clock regeneration circuit, coupled to the second slicer, which outputs a second regenerated clock signal based on the second binarization signal;
- a second data regeneration circuit, coupled to the second slicer and the second clock regeneration circuit, which outputs the second regenerated data signal based on the second binarization signal and the second regenerated clock signal;
- a second timing adjustment circuit, coupled to the second data regeneration circuit, which outputs the second delayed regenerative signal based on the second regenerated data signal.

18. A regenerated data signal generation circuit comprising:
- a receiving circuit for receiving a modulated signal and demodulating the modulated signal into a demodulated signal;
- a first slicer coupled to the receiving circuit, which receives the demodulated signal and which binarizes the demodulated signal while compensating for offset deviation of the demodulated signal by a first method so that the first slicer outputs a first binarization signal;
- a second slicer, coupled to the receiving circuit which receives the demodulated signal and which binarizes the demodulated signal while compensating for offset deviation of the demodulated signal by a second method that is different from the first method so that the second slicer outputs a second binarization signal; and
- a signal preparation, circuit connected to the first and second slicers, which receives the first and second binarization signals and selectively outputs a delayed regenerative data signal prepared from one of the binarization signals,
- wherein the first slicer is a differential type data slicer which includes:

a buffer coupled for receiving the demodulated signal;
a capacitor connected to the buffer;
a first DC bias circuits connected to the capacitor;
a second DC bias circuits;
a differential buffer having a first input connected to the capacitor and a second input connected to the second DC bias circuit and first and second outputs; and
a comparator connected to the first and second outputs of the differential buffer for outputting the first binarization signal.

* * * * *